3,423,446
PREPARATION OF VINYLIC MAGNESIUM
ALUMINUM COMPOUNDS
Paul Kobetz and Wilford H. Thomas, Baton Rouge, La.,
assignors to Ethyl Corporation, New York, N.Y., a corporation of Virginia
No Drawing. Filed Oct. 26, 1964, Ser. No. 406,585
U.S. Cl. 260—448          2 Claims
Int. Cl. C07f 5/06; C07f 3/02

ABSTRACT OF THE DISCLOSURE

This invention discloses a new process for the preparation of organometallic complex compounds by mixing a vinylic magnesium compound with a triorganoaluminum compound.

BACKGROUND OF THE INVENTION

The complex compounds of this invention are compounds of the formula $$Mg(AlR_xVi_{4-x})_2$$

wherein R is an organic radical having from 1 to 18 carbon atoms, Vi is a vinylic radical and $x$ is a number from 0 to 3, such as from 1 to 3.

Accordingly, an object of this invention is to provide novel compositions of matter and a method for their preparation. A particular object is to provide novel organometallic complex compounds containing magnesium, aluminum, and at least one vinylic radical. These and other objects will be apparent in the description which follows.

It has now been found that complexes containing magnesium, aluminum and at least one vinylic organic radical are highly practical and useful products. Particularly preferred are compositions wherein R of the formula is selected from the group consisting of hydrocarbon radicals and hydrocarbonoxy radicals. Thus a particularly unique embodiment of the invention comprises organometallic compositions containing magnesium, aluminum, at least one saturated hydrocarbon or hydrocarbonoxy radical and at least one vinylic radical.

A novel and preferred method for the preparation of the complexes of this invention involves reacting a compound of the formula $Vi_2Mg$ with a compound of the formula $AlR_3$ wherein R is an organic radical having 1 to 18 carbon atoms. R will ordinarily be alkyl, aryl, alkoxy and aroxy and mixtures thereof. R will preferably be alkyl or alkoxy because of ease of formation of the complex.

The present invention is further illustrated by the following Examples. All parts are by weight unless otherwise specified.

EXAMPLE I

A complex of divinyl magnesium and trimethylaluminum was formed. The divinyl magnesium was prepared by reacting a tetrahydrofuran (THF) solution of vinyl magnesium chloride with the dimethyl ether of diethylene glycol (DMC). The complex was formed as follows: First vinyl magnesium chloride was prepared by the reaction of magnesium and vinyl chloride. Magnesium chips, 121.6 g., were reacted in 1.075 g. of tetrahydrofuran (THF) with 396 g. of vinyl chloride. The reaction product was cooled and unreacted vinyl chloride was vented. The product solution, 1300 ml., was decanted and 500 ml. of tetrahydrofuran was added to extract the residue. Most of the residue went into solution, which was then decanted and added to the product solution making a total of 1900 ml. Aliquots of this product solution indicated it was 2.64 molar with respect to magnesium and 2.74 molar with respect to chloride ions. The product was vinyl magnesium chloride dissolved in tetrahydrofuran.

A 125 ml. portion of the vinyl magnesium chloride product solution (equivalent to about 335 millimols of vinyl magnesium chloride) and 200 ml. of the dimethyl ether of diethylene glycol were added to a 500 ml. round bottom flask with a magnetic stirrer. The flask contents were heated to 50° C. and stirred slowly for 20 minutes to cause the magnesium chloride crystals to grow to facilitate their removal by filtration. The solids were removed by a vacuum filtration in a dry box using a fine fritted glass filter and washed with two 15 ml. portions of DMC. The THF and some DMC were removed from the filtrate by warming the flask with a heating mantle while pulling a strong vacuum on the flask. Aliquots of the filtrate were analyzed for magnesium and chloride. An aliquot was hydrolyzed, evolved gases were collected and analyzed by mass spectrographic methods. A sample of the vinyl magnesium chloride in THF was also hydrolyzed and evolved gases analyzed for a comparison. The solids on the fritted glass filter were dissolved in a small quantity of dilute sulfuric acid and analyzed for magnesium and chloride ions. The magnesium and chloride analysis revealed that 85 to 90 mol percent of the vinyl magnesium chloride was converted to divinyl magnesium.

The complex of divinyl magnesium and trimethylaluminum was formed by mixing a quantity of the divinyl magnesium solution formed above in an amount equivalent to .039 mole of divinyl magnesium with 5 ml. of trimethylaluminum.

EXAMPLE II

A complex of divinyl magnesium and trimethylaluminum is formed by the reaction of a portion of the same DMC solution of divinyl magnesium formed in Example I with trimethylaluminum. The divinyl magnesium is utilized in an amount equivalent to one mole of divinyl magnesium per mole of trimethylaluminum. The complex is formed by mixing the reactants, with each reactant being initially at room temperature.

EXAMPLE III

Example II is repeated with the exception that 0.9 mole of triethylaluminum is utilized per mole of divinyl magnesium. The complex of divinyl magnesium and triethylaluminum is formed by mixing the reactants.

EXAMPLE IV

A complex of divinyl magnesium and methoxydimethylaluminum is formed by adding methoxydimethylaluminum in an amount equivalent to 1.0 mole of methoxydimethylaluminum per mole of divinyl magnesium. The divinyl magnesium utilized is present as a solution in a solvent which contains 50% by weight DMC and 50% by weight THF.

EXAMPLE V

A complex is formed by the addition of 1.1 mole of divinylmethylaluminum per mole of divinyl magnesium. The divinyl magnesium utilized is present in a solvent comprising 50% by weight DMC and 50% by weight THF.

EXAMPLE VI

A complex of di-1-propenyl magnesium and trimethylaluminum is formed by the reaction of 2 moles of trimethylaluminum with 1 mole of di-1-propenyl magnesium in DMC as a solvent.

EXAMPLE VII

A complex of divinyl magnesium and triphenylaluminum is formed by the reaction of divinyl magnesium in DMC as a solvent with triphenylaluminum in an amount equivalent to 1.5 moles of triphenylaluminum per mole of divinyl magnesium.

EXAMPLE VIII

A solution of divinyl magnesium in a solvent containing 50% by weight DMC and 50% by weight THF is reacted with 0.5 mole of triphenoxyaluminum to form a complex of divinyl magnesium and triphenoxyaluminum.

EXAMPLE IX

A complex of di-2-methyl-1-propenyl magnesium and trimethylaluminum is formed by reacting 1 mole of di-2-methyl-1-propenyl magnesium with 1 mole of trimethylaluminum.

The vinylic magnesium compounds employed in the formation of the complexes of the present invention are subject to some latitude. At least one vinylic radical is attached to the magnesium. The vinylic radicals are radicals of 2–8 carbon atoms, preferably 1-alkenyl radicals, with the preferred radicals having from 2–4 carbon atoms. The vinylic radicals may be, for example, ethenyl, 1-propenyl, isopropenyl, 1-butenyl, 2-methylpropenyl, 2-ethyl-1-hexenyl, mixtures thereof and the like. The second radical attached to the magnesium will be aliphatic and may also be a vinylic radical or it may be an alkyl radical. The alkyl radicals will have from 1–8 carbon atoms with the preferred range being from 1–4 carbon atoms. Preferably, the vinylic magnesium compounds will be divinylic magnesium compounds. Examples of vinylic magnesium compounds are divinyl magnesium, methylvinyl magnesium, ethylvinyl magnesium, di-1-propenyl magnesium, vinylpropenyl magnesium, diisopropenyl magnesium, di-1-butenyl magnesium, di-1-methyl-1-butenyl magnesium, di-1-octenyl magnesium, mixtures thereof and the like. Unsubstituted vinylic magnesium compounds are preferred. A particularly preferred vinylic magnesium compound is divinyl magnesium because of the relative ease of preparation and its greater reactivity compared to other vinylic compounds.

The vinylic magnesium compounds may be prepared in a number of ways. One method is illustrated in Example I above. That is, a solution of a vinylic Grignard reagent in tetrahydrofuran is combined with the dimethyl ether of ethylene glycol whereby magnesium halide precipitates out of solution leaving the vinylic magnesium compound in solution. Another method of preparation is disclosed in U.S. 2,999,889, issued Sept. 12, 1961. According to this patent divinyl magnesium is produced by the reaction of divinylmercury with magnesium.

The triorgano aluminum employed in forming the complexes of the present invention may be varied. Radicals attached to the aluminum radicals include alkyl radicals such as methyl, ethyl and isopropyl; alkenyl radicals such as vinyl and 1-propenyl; alkynyl radicals such as ethynyl; alkoxy such as butoxy; aryl such as phenyl, phenoxy, benzyl or tolyl and the like. The compounds will suitably have at least one carbon to aluminum bond. Preferred are the trialkyl compounds or the combinations of alkyl and alkoxy radicals. The radicals will have from 1 to 8 carbon atoms with these having from 1 to 2 giving superior results. By way of illustration of the triorganoaluminum compounds employable, the following are typical examples: triethylaluminum, triisobutylaluminum, trivinylaluminum, trihexylaluminum, trioctylaluminum, tri-3-hexenylaluminum, methyldiethylaluminum, trimethoxyaluminum, methyldiphenylaluminum, mixtures thereof and the like. Trimethylaluminum constitutes an especially preferred embodiment because of its reactivity and of the properties of the products formed.

The complexes of the present invention are obtained preferably by mixing in the liquid state the vinylic magnesium compound, such as those typified above, in essentially anhydrous condition with the triorgano aluminum compound, preferably with heating in the presence of an inert atmosphere such as nitrogen. The ratio of the vinylic magnesium compound to the triorgano aluminum compound can be varied such as from 0.1 to 50 moles of vinylic magnesium compound per mole of triorgano aluminum compound. Best results are obtained when the ratio of vinylic magnesium compound to triorgano aluminum compound is between about 0.5 to 5 moles per mole of triorganoaluminum compound. Complex formation wherein essentially one mole of the vinylic magnesium compound and two moles of the triorganoaluminum compound are employed is preferred. However, an excess of either ingredient over the amount needed for complex formation may be utilized. Any excess may remain in the electrolyte solution and be electrolyzed to form tetraorganolead compounds. During preparation of the complex, at least one of the compounds should be in the liquid state, and this may be accomplished, if necessary, by heating one or both of the reactants.

The complexes of this invention may be described as bimetallic organo complexes having at least one vinylic radical wherein the metallic elements are magnesium and aluminum. Examples of such complexes are

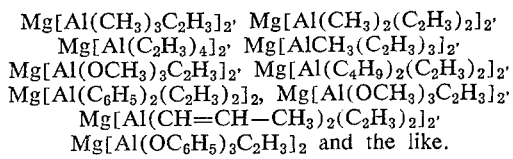

$Mg[Al(CH_3)_3C_2H_3]_2$, $Mg[Al(CH_3)_2(C_2H_3)_2]_2$,
$Mg[Al(C_2H_3)_4]_2$, $Mg[AlCH_3(C_2H_3)_3]_2$,
$Mg[Al(OCH_3)_3C_2H_3]_2$, $Mg[Al(C_4H_9)_2(C_2H_3)_2]_2$,
$Mg[Al(C_6H_5)_2(C_2H_3)_2]_2$, $Mg[Al(OCH_3)_3C_2H_3]_2$,
$Mg[Al(CH=CH-CH_3)_2(C_2H_3)_2]_2$,
$Mg[Al(OC_6H_5)_3C_2H_3]_2$ and the like.

A suitable essentially inert solvent may be employed to solubilize one or more of the reactants, especially the triorganoaluminum compound. A solvent, however, is not essential to the operation of the process and its absence may be desirable in some instances. In general, solvents suitable are the ethers and polyethers (including cyclic ethers), tertiary amines, other organometallics, amides and substituted amides, and hydrocarbons, particularly the aromatic hydrocarbons. Typical examples of suitable solvents are illustrated in the above examples. Other suitable solvents are such as triisophropyl amine, toluene, xylene, and the like. Additional typical examples of suitable solvents are dialkylamides such as diethylamide and ethers, such as dimethyl ether, methylethyl ether, methyl-n-propyl ether, and mixtures of these. Suitable polyethers are ethylene glycol diethers, such as methylethyl, diethyl, ethylbutyl, and dibutyl; diethylene glycol ethers, such as dimethyl, diethyl, ethylbutyl and butyl lauryl; trimethylene glycol ethers, such as dimethyl, methylethyl; glycerol ethers, such as trimethyl, diethyl methyl, etc.; and cyclic ethers, such as dioxane and tetrahydrofuran. Typical amines suitable for this invention include aliphatic and aromatic amines and heterocyclic nitrogen compounds. The preferred tertiary amines for use in this invention are trimethyl amine, dimethyl ethyl amine, tetramethyl ethylene diamine and n-methyl morpholine. Primary and secondary amines can also be used, such as methyl amine, dimethyl amine, and so forth. The selection of the amount of solvent or diluent to be utilized, if any, can be determined by one skilled in the art by considering such factors as the degree of fluidity desired, reaction rate and so forth.

The process may be operated as a batch or continuous process. All of the vinylic magnesium compound and triorgano aluminum compound may be added initially or any of these may be added continuously or intermittently throughout the reaction. Of course, in a continuous operation the composition may be continuously or intermittently removed from the reactor.

The reactor employed may be of conventional design. The reactor should, of course, be suitable for operating under the pressure generated by the particular reactants at the temperature of reaction.

The temperature of reaction is not critical. It should be sufficiently high to give reasonable reaction rates but should not be above the decomposition temperature of the organometallic reactants or the organometallic products. Thus, the operating temperature of the reaction depends upon the particular organometallic compounds involved. In general, suitable temperatures are between about 0° C. and about 100° C., but temperatures from about 20 to 40° C. are preferred to facilitate heat removal and for best results. Higher temperatures can be employed when using thermal stabilizers. In some instances considerable exothermic heat is generated and consequently a cooling medium may be desired to control the temperature.

About atmospheric pressure is normally employed, although subatmospheric pressures are permissible. In some instances, supraatmospheric pressure is preferred, particularly when employing a relatively high temperature and a relatively volatile solvent. Also, a pressure of inert gas such as nitrogen is sometimes desirable, for example, to assure anhydrous conditions. The pressure will generally be from about 10 inches vacuum to 1000 p.s.i.g. with the range of about atmospheric (STP) to 50 p.s.i.g. being particularly suitable.

The complexes of this invention possess unusual characteristics. In fact, the ability to form the complexes at all was unexpected as it would have been thought that the reaction of the vinylic magnesium compound and the aluminum compound would have formed a polymer if any compound was formed. One reason that a polymer would have been expected is that vinyl aluminum compounds are readily polymerized. For instance, if an ether solution of vinyl aluminum, $(C_2H_3)_3Al$, is simply heated, a polymer precipitate is formed. On the other hand, the complexes of the present invention are aluminum compounds that contain vinylic groups and these monomeric compounds may be placed in solution and separated from solution without significant polymer formation. Because these complexes are not prone to polymerize, they are valuable as intermediates in synthesis. For example, one mole of magnesium aluminum trimethylvinyl may be reacted with one mole of didecyl ketone to produce the corresponding dialkyl vinyl alcohol.

Having thus described the novel compositions and the novel method of preparing them, it is not intended that they be limited except as set forth in the following claims.

What is claimed is:

1. A process for the preparation of an organometallic complex represented by the formula $Mg[AlR_2Vi_2]_2$ which comprises reacting an aluminum compound represented by the formula $AlR_2Vi$ with a magnesium compound represented by the formula $MgVi_2$ wherein each R is a radical selected from a group consisting of alkyl, alkoxy and aryl radicals having from 1–8 carbon atoms and each Vi is a vinylic radical having from 2–8 carbon atoms.

2. The process of claim 1 further characterized by the aluminum compound represented by the formula $AlR_2Vi$ being $Al(CH_3)_2(C_2H_3)$, magnesium compound represented by the formula $MgVi_2$ being $Mg(C_2H_3)_2$ and the produced organometallic compound being $$Mg[Al(CH_3)_2(C_2H_3)_2]_2.$$

References Cited

UNITED STATES PATENTS

| | | | |
|---|---|---|---|
| 3,007,970 | 11/1961 | Ashby | 260—606.5 |
| 3,052,702 | 9/1962 | Robinson | 260—437 |
| 3,088,957 | 5/1963 | McKay | 260—437 |
| 3,098,862 | 7/1963 | Kobetz | 260—448 X |
| 3,262,958 | 7/1966 | Riddle | 260—448 |

TOBIAS E. LEVOW, *Primary Examiner.*

U.S. Cl. X.R.

260—638